(No Model.)

W. J. PERKINS.
JOURNAL BOX.

No. 365,199. Patented June 21, 1887.

Attest:
C. H. H. Brown,
Frank Brawner.

Inventor:
Willis J. Perkins.
By Wallace A. Bartlett
His attorney.

UNITED STATES PATENT OFFICE.

WILLIS J. PERKINS, OF GRAND RAPIDS, MICHIGAN.

JOURNAL-BOX.

SPECIFICATION forming part of Letters Patent No. 365,199, dated June 21, 1887.

Application filed February 21, 1887. Serial No. 228,329. (No model.)

*To all whom it may concern:*

Be it known that I, WILLIS J. PERKINS, residing at Grand Rapids, in the county of Kent and State of Michigan, have invented certain new and useful Improvements in Journal-Boxes, of which the following is a specification, reference being had therein to the accompanying drawings.

This invention relates to boxes for journal-bearings; and it consists in the construction and combination of parts, hereinafter described and claimed.

The object of the invention is to produce a journal-box in which the cover shall be held to position by a movable bail.

Figure 1:
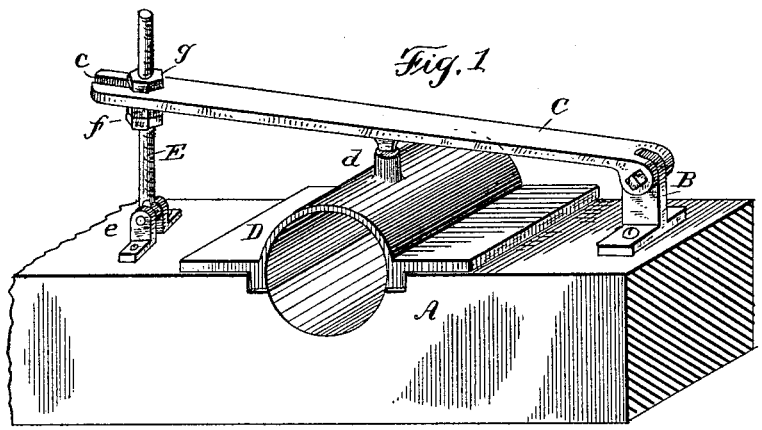
Figure 2:
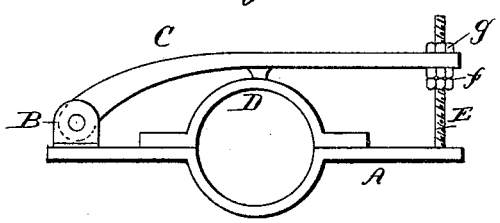

Figure 1 is a perspective view of a journal-box and cover embodying my invention. Fig. 2 is an elevation of a box of a slightly-modified construction.

One member of the box, A, has the fixed or wearing surface in which the journal rests. This member has connected with it a lug or standard, B, to which a bail, C, is pivoted. The cap D is of any common form, so far as relates to the part A of the box, but may have a boss, *d*, at its central upper surface, on which bail C rests. The bail C extends across the cap D, and has a perforation or slot, *c*, through which a threaded rod, E, extends, said rod being secured to the base A of the box, either rigidly, as in Fig. 2, or by means of a hinge-connection, as at *e* in Fig. 1.

The screw-threaded rod E is provided with an adjustable piece, as a lock-nut, *f*, below the point at which it is desired the bail shall rest, and this lock-nut may be adjusted to any desired position. The bail closes down toward the base A, the rod E passing through the hole or slot in the bail, and the lock-nut *f* determines the position the bail shall occupy when closed down and held by the nut *g*.

The bail C extends across the cap D and holds it down, by a central bearing. By unscrewing the nut *g* slightly the bail may be lifted and cap D may be removed in the direction of the length of the shaft, or the nut *g* may be removed from rod E and the bail lifted. When the rod E is hinged, as shown in Fig. 1, said rod may be swung on its hinge when the nut *g* is loosened, and then the bail C can be lifted without obstruction.

The application of a bail over the cap of the box secures an even bearing. The lock-nut on the rod E enables the pressure on the cover to be regulated, and the securing of the bail by a single nut insures quickness of adjustment and removal to the cap.

I claim—

1. The combination, in a journal-box, of the base, a cap, and a bail hinged to the base-piece and passing over the cap, and a device for holding the bail in position, substantially as described.

2. The combination, with the base of a journal-box, of a bail hinged thereto, a cap over which the bail passes, and a screw-rod having a nut thereon, by which the swinging end of the bail is secured, substantially as described.

3. The combination, with the base of a journal-box, of a cap, a bail hinged to the base and passing over the cap, a rod on the side of the box opposite the hinged end of the bail, and an adjustable piece on the screw-rod forming a rest against which the bail is secured.

4. The combination of the base A, the bail C, and the screw-rod E, hinged thereto, the cap D, intermediate the hinges of the bail and rod, and the nuts on the screw-rod E, all substantially as shown and set forth.

In testimony whereof I affix my signature in presence of two witnesses.

WILLIS J. PERKINS.

Witnesses:
  PHILIP MAURO,
  W. A. BARTLETT.